United States Patent
Zheng et al.

(10) Patent No.: US 7,032,705 B2
(45) Date of Patent: Apr. 25, 2006

(54) OVERSTEERING/UNDERSTEERING COMPENSATION WITH ACTIVE FRONT STEERING USING STEER BY WIRE TECHNOLOGY

(75) Inventors: Bing Zheng, Dublin, OH (US); Barry Lenart, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 14 days.

(21) Appl. No.: 10/789,572

(22) Filed: Feb. 27, 2004

(65) Prior Publication Data

US 2005/0189161 A1    Sep. 1, 2005

(51) Int. Cl.
*B62D 6/00* (2006.01)
(52) U.S. Cl. .................. 180/446; 701/41; 701/48; 701/72; 701/74; 701/70
(58) Field of Classification Search .......... 180/402, 180/446; 701/41, 48, 70, 72, 74
See application file for complete search history.

(56) References Cited

U.S. PATENT DOCUMENTS

| | | | |
|---|---|---|---|
| 4,941,097 A * | 7/1990 | Karnopp et al. ............... 701/41 |
| 5,247,441 A | 9/1993 | Serizawa et al. |
| 5,347,458 A | 9/1994 | Serizawa et al. |
| 5,893,896 A * | 4/1999 | Imamura et al. ............... 701/41 |
| 5,941,919 A | 8/1999 | Pastor et al. |
| 6,292,094 B1 * | 9/2001 | Deng et al. .................... 701/41 |
| 6,324,446 B1 | 11/2001 | Brown et al. |
| 6,415,212 B1 | 7/2002 | Nishizaki et al. |
| 6,449,542 B1 | 9/2002 | Böttiger et al. |
| 6,505,703 B1 | 1/2003 | Stout et al. |
| 6,547,031 B1 * | 4/2003 | Magnus ....................... 180/446 |
| 6,554,095 B1 | 4/2003 | Zheng et al. |
| 6,640,173 B1 * | 10/2003 | Zheng ............................ 701/41 |
| 6,659,218 B1 * | 12/2003 | Thomas et al. ............. 180/402 |
| 2003/0028306 A1 | 2/2003 | Fujimori |
| 2003/0055545 A1 | 3/2003 | Uenuma et al. |
| 2003/0060955 A1 | 3/2003 | Suissa |

FOREIGN PATENT DOCUMENTS

WO    WO 02/074607    9/2002

* cited by examiner

*Primary Examiner*—Lesley D. Morris
*Assistant Examiner*—Matthew Luby
(74) *Attorney, Agent, or Firm*—Brinks Hofer Gilson & Lione

(57) ABSTRACT

The present invention provides a system for compensating understeer and oversteer in a vehicle having a steer by wire system. The system includes a driver interface system, a sensor system, a controller, and a road wheel steering actuation system. The driver interface system receives steering input from the driver. The sensor system senses the steering input and generates a steering control signal that is received by the controller. The controller determines if an understeer or oversteer condition exists and generates an appropriate steering assist signal that is then communicated to the road wheel steering actuation system. In response to the steering assist signal, the road wheel steering actuation system adjusts the road wheel angle to compensate for the understeer or oversteer condition.

19 Claims, 3 Drawing Sheets

//! OVERSTEERING/UNDERSTEERING COMPENSATION WITH ACTIVE FRONT STEERING USING STEER BY WIRE TECHNOLOGY

BACKGROUND

1. Field of the Invention

The present invention generally relates to a system for providing oversteer and understeer compensation to a vehicle using steer by wire technology.

2. Related Technology

Oversteer is the tendency of a vehicle to steer more than the driver intends. As a result, oversteer may cause the rear of the car to slide due to the rear tires loosing lateral traction, which may result in the vehicle spinning. Understeer is the tendency of the vehicle to steer less than the driver intends. Both events are non-desirable for vehicle handling.

In view of the above, it is apparent that there exists a need for a system to provide oversteer and understeer compensation for vehicles. With steering by wire technology, there is no mechanical connection between steering wheel and road wheels. An extra road wheel angle can be added to compensate the oversteer or understeer when it occurs.

SUMMARY

In satisfying the above need, as well as overcoming the enumerated drawbacks and other limitations of the related technology, the present invention provides a system for compensating understeer and oversteer in a vehicle having a steer by wire system. A system embodying the principles of the present invention includes a variety of subsystems such as a driver interface subsystem, a sensor subsystem, a controller, and a road wheel steering actuation subsystem. The driver interface subsystem receives steering input from the driver. The sensor subsystem senses the steering input received by the driver interface subsystem and generates a steering control signal. Being in electrical communication with the sensor subsystem, the controller receives the steering control signal. The controller determines if an understeer or oversteer condition exists and, if so, generates an appropriate steering assist signal. Being in communication with the controller, the road wheel steering actuation subsystem receives the steering assist signal. In response to the steering assist signal, the road wheel steering actuation subsystem adjusts the road wheel angle to compensate for the understeer or oversteer condition.

In another aspect of the present invention, a controller is configured to determine if an understeer condition exists based on a measured yaw rate, a measured lateral acceleration, a desired yaw rate, and a desired lateral acceleration. The controller determines that an understeer condition exists when the magnitude of desired yaw rate is greater than the measured yaw rate (by a given threshold value for a given time period) and the magnitude of the desired lateral acceleration is greater than the measured lateral acceleration (by a given threshold for a given time period). Similarly, the controller determines that an oversteer condition exists when the magnitude of the desired yaw rate is less than the measured yaw rate (by a given threshold value for a given time period) and when the magnitude of the desired lateral acceleration is less than the measured lateral acceleration (by a given threshold value for a given time period).

Further objects, features and advantages of this invention will become readily apparent to persons skilled in the art after a review of the following description, with reference to the drawings and claims that are appended to and form a part of this specification.

DETAILED DESCRIPTION

Figure 1:
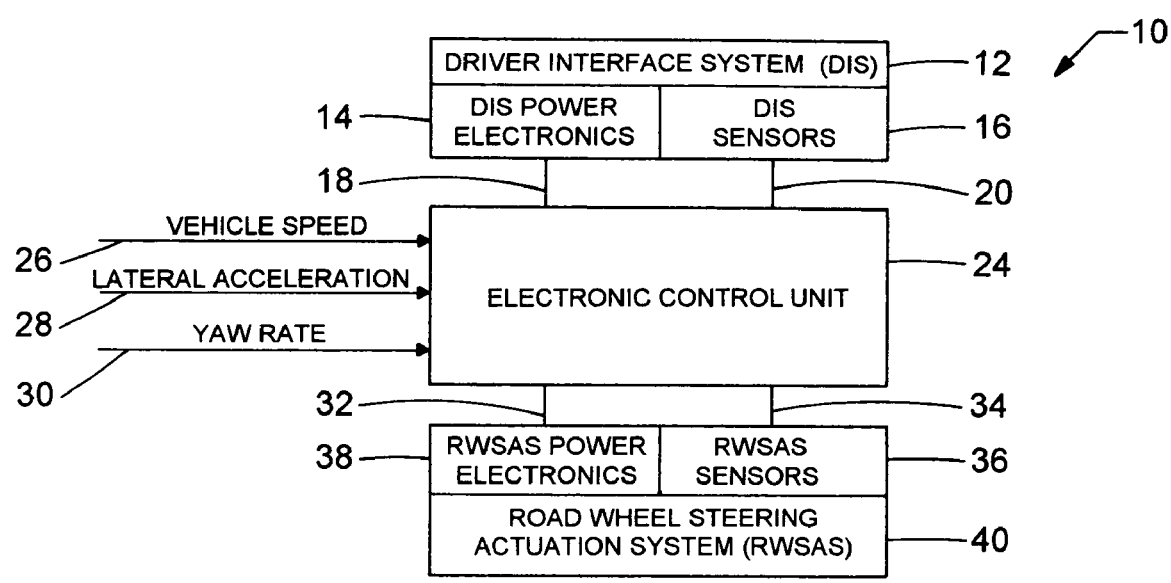
FIG. 1 is a block diagram of a steer by wire system including oversteer and understeer compensation embodying the principles of the present invention.

Referring now to the drawings, a vehicle steering control system embodying the principles of the present invention is illustrated therein and designated at 10. As its primary components, the system 10 includes a driver interface subsystem 12, an electronic control unit 24, and a road wheel steering actuation system 40.

The driver interface subsystem (DIS) 12 is provided to receive steering input from the driver of the vehicle. Although other forms of steering input are contemplated, the driver input generally takes the form of turning a steering wheel. DIS sensors 16 monitor the driver input such as steering wheel angle, and steering wheel rate of change. The sensors 16 provide signals, corresponding to the steering input, to the electronic control unit 24 along line 20. The electronic control unit 24 also monitors other vehicle parameters including vehicle speed 26, lateral acceleration 28, and yaw rate 30. Utilizing the steering input received along line 20 and the other vehicle parameters, the electronic control unit 24 generates road wheel control signals.

The road wheel control signals are provided by the electronic control unit 24 to the road wheel steering actuation system (RWSAS) power electronics 38 as indicated along line 32. To steer the vehicle, the RWSAS power electronics 38 manipulate the road wheel steering actuation system 40 to change the angle of the road wheels. RWSAS sensors 36 monitor various parameters of the road wheels and the road wheel steering actuation system 40. Parameters monitored by the RWSAS sensors 36 include the road wheel angles, the road wheel angle rate of change, and current provided to drive the road wheel steering actuation system 40. The RWSAS sensors 36 provide the road wheel and road wheel steering actuation system parameters (the road wheel steering parameters) to the electronic control unit 24 along line 34.

The electronic control unit 24 continuously utilizes the steering input, vehicle parameters, and road wheel steering parameters as feedback to continually adjust the road wheel control signals improve vehicle handling. Similarly, the electronic control unit 24 provides feedback to the driver interface system 12 by generating steering wheel control signals that are provided to the driver interface power electronics 14 along line 18. The driver interface power electronics 14 utilize various known methods to provide feedback torque to the driver interface subsystem 12. One example includes providing feedback torque to the steering wheel to simulate the road wheel feel of a direct mechanical linkage.

Figure 2:
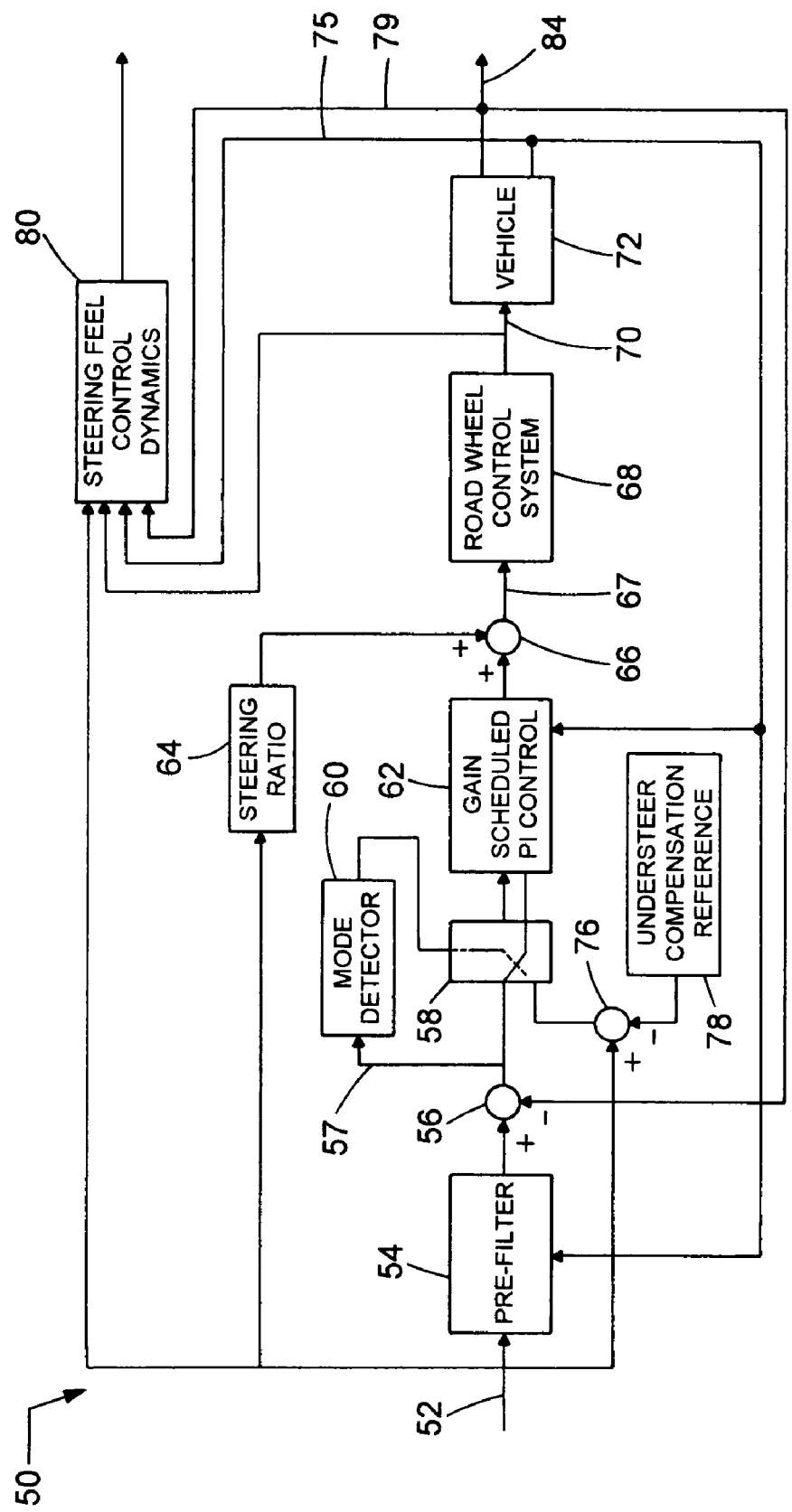
FIG. 2 is a block diagram of a control system including oversteer and understeer compensation embodying the principles of the present invention.

Now referring to FIG. 2, a block diagram of the steering control system and algorithm effectuated by the electronic control unit 24 is provided. The control algorithm, generally denoted by reference numeral 50, is configured to compensate for oversteer and understeer conditions. The steering wheel angle is provided to the prefilter 54. The prefilter 54 calculates the desired yaw and desired lateral acceleration from the measured steering wheel angle signal 52 and vehicle speed signal 75 from the vehicle 70.

The output of the prefilter 54 constitutes the desired yaw rate and desired lateral acceleration, which are calculated in such a way that considers the steering wheel angle, the steering ratio, the vehicle speed, as well as other vehicle parameters including the wheel base and understeer coefficient. One embodiment of the mathematical relationship of the desired yaw rate and desired lateral acceleration as calculated in the prefilter 54 is provided in Equation 1 and Equation 2.

$$r_{des} = \frac{VhSpd * Steeringratio * SWA}{L + K * VhSpd^2} \quad (1)$$

where,
$r_{des}$: desired yaw rate
L: wheelbase of the vehicle
K: understeer coefficient
VhSpd: vehicle speed
SWA: steering wheel angle
Steeringratio: steering ratio $$Lat_{des} = \frac{VhSpd^2 * Steeringratio * SWA}{L + K * VhSpd^2} \quad (2)$$

where,
$Lat_{des}$: desired lateral acceleration
L: wheelbase of the vehicle
K: understeer coefficient
VhSpd: vehicle speed
SWA: steering wheel angle
Steeringratio: steering ratio The measured yaw rate 30 and lateral acceleration 28, communicated from the vehicle 70 via line 79, are compared with the desired yaw rate and desired lateral acceleration as indicated by block 56. The mode detector 60 determines when an understeer or oversteer condition exists. If the magnitude of the desired yaw rate is greater than the measured yaw rate (by a given threshold within a pre-specified time period) and the magnitude of the desired lateral acceleration is greater than the measured lateral acceleration (by a given threshold for a pre-specific time period), the vehicle is determined to be in an understeer condition. Conversely, if the magnitude of the desired yaw rate is smaller than the measured yaw rate (for a given threshold within a pre-specified time period) and the magnitude of the desired lateral acceleration is smaller than the measured lateral acceleration (by a given threshold within the pre-specified time period), the vehicle is determined to be in an oversteer condition.

Block 58 receives the output of the mode detector 60 to identify if an oversteer or understeer condition exists. If an understeer condition exists, block 58 provides the difference of the steering wheel angle signal 52 and an understeer compensation reference, from block 76, as an input to a proportional integral control algorithm 62. Alternatively, if an oversteer condition exists, block 58 passes through the desired yaw rate and lateral acceleration signal 57, provided from block 56, as the input to the gain scheduled proportional integral control algorithm 62.

In the understeer compensation mode, the controller compensates the understeer by adjusting the road wheel angle back to the point where the error between the measured lateral acceleration and the desired lateral acceleration is minimized. This is done by decreasing the absolute road wheel angle with respect to the nominal commanded road wheel angle. The effect of the road wheel angle changes are to reduce the road wheel angle so that the front wheels are turning back to where the lateral traction can be maximized, thereby reducing the understeer condition. When compensating for understeer, the input to the proportional integral control algorithm 62 is the difference between the steering wheel angle and a predetermined understeer compensation reference value. The predetermined understeer compensation reference value is scheduled with respect to the vehicle speed according to the relationship defined in equation 3.

$$UnStrCmp_{ref} = \frac{RWA_{max}}{1 + k * VhSpd} \quad (3)$$

where, $RWA_{max}$ is maximal allowable road wheel angle, k is an empirically determined value for the vehicle.

In the oversteer compensation mode, the controller compensates oversteer by changing the road wheel angle with respect to the nominal commanded road wheel angle reference. This road wheel angle change is in the opposite direction to the nominal commanded road wheel angle reference. The effect of the road wheel angle change is to change the road wheel angle in the opposite direction that the vehicle is turning so the yaw rate error and lateral error can be minimized thereby reducing the oversteer condition.

When no oversteer or understeer condition is occurring, the electronic control unit 24 simply provides yaw compensation in a manner similar to the oversteer compensation.

The magnitude and rate of road wheel angle change are determined by the gain scheduled proportional integral algorithm 62. The gain of the proportional integral algorithm 62 is scheduled with respect to the vehicle speed signal 75. The higher the vehicle speed, as indicated by the speed signal 75, the higher the gain of the proportional integral algorithm 62. The fading effect of the proportional integral algorithm 62 assures that the assist is implemented upon occurrence of oversteer and understeer conditions, while allowing the driver to remain in control of the vehicle.

The output of the proportional integral control algorithm 62 provides a steering assist signal which is added to the nominal steering signal, as indicated by block 66. This results in a compensated steering angle 67 that is received by the road wheel control system 68. The road wheel control system 68 adjusts the road wheel angle 70 thereby providing steering compensation for the vehicle 72. Driver feedback is also provided as the steering wheel angle signal 52, the road wheel angle signal 70, the vehicle speed signal 75, and the yaw rate and lateral acceleration signals 84 are provided to the steering feel control dynamics algorithm, as noted by block 80.

Figure 3:
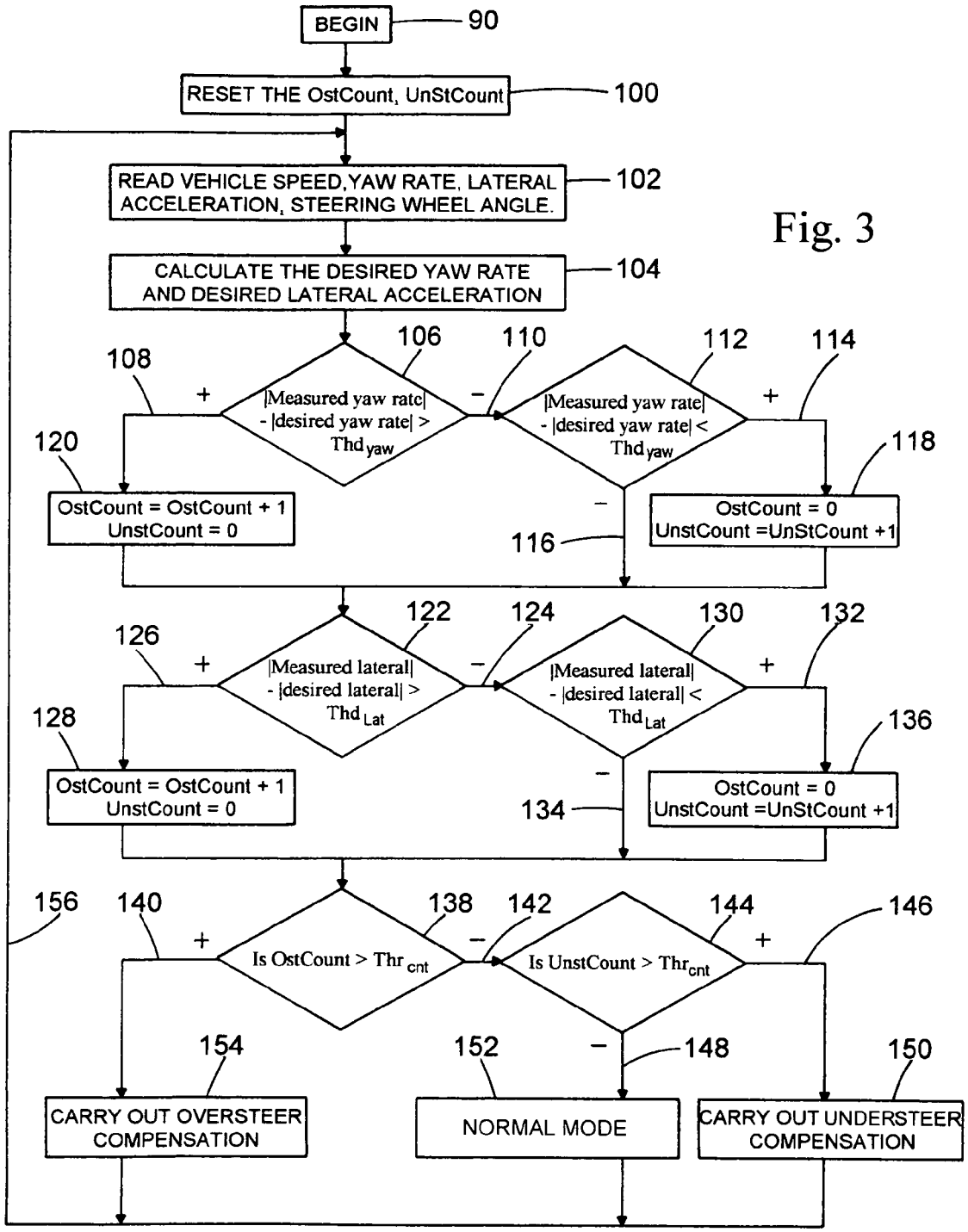
FIG. 3 is a flow chart of a process for implementing oversteer and understeer compensation in accordance with the principles of the present invention.

Now referring to FIG. 3, a method is also provided to compensate for oversteer and understeer conditions according to the present invention. Block 90 indicates the start of the compensation algorithm. In block 100, the oversteer counter and understeer counter are reset to initialize the algorithm. The electronic control unit 24 reads the vehicle speed, yaw rate, lateral acceleration, and steering wheel angle, as indicated by block 102, and then calculates the desired yaw rate and desired lateral acceleration, as denoted by block 104.

As indicated by block 106, if the absolute value of the measured yaw rate subtracted from the absolute value of the desired yaw rate is greater than a threshold yaw value (Thdyaw), the process proceeds along line 108 and the oversteer count (OstCount) is incremented and the understeer count (UnstCount) is set equal to zero, as denoted by block 120. Alternatively, if the absolute value of the measured yaw rate minus the absolute value of the desired yaw rate is not greater than a threshold yaw value, the process flows along line 110. In block 112, if the absolute value of the measured yaw rate subtracted from the absolute value of the desired yaw rate is less than the threshold yaw value, the process flows along line 114 and the oversteer count is set to zero while the understeer count is incremented, as denoted by block 118. However, if the absolute value of the measured yaw rate minus the absolute value of the desired yaw rate is not less than the threshold yaw value in block 112, the process flows along line 116 to block 122.

In block 122, if the absolute value of the measured lateral acceleration subtracted from the absolute value of the desired lateral acceleration is greater than the lateral acceleration threshold ($Thd_{Lat}$), the process flows along line 126 and the oversteer count is incremented while the understeer count is set to zero, as denoted by block 128. If the absolute value of the measured lateral acceleration minus the absolute value of the desired lateral acceleration is not greater than the lateral acceleration threshold, the process flows along line 124 to block 130. In block 130, if the absolute value of the lateral acceleration minus the absolute value of the desired lateral acceleration is less than the lateral acceleration threshold, the process flows along line 132 and the oversteer count is set equal to zero and the understeer count is incremented, as indicated by block 136. Alternatively, if the absolute value of the measured lateral acceleration minus the absolute value of the desired lateral acceleration is not less than the lateral acceleration threshold, the process flows along line 134 to block 138.

In block 138, if the oversteer count is greater than the count threshold ($Thr_{cnt}$), the process flows along line 140 and the oversteer compensation is carried out as denoted by block 154. However, if the oversteer count is not greater than the threshold count, the process flows along line 142 to block 144. In block 144, if the understeer count is greater than the threshold count, the process flows along line 146 and the understeer compensation is carried out as denoted by block 150. Alternatively, if the understeer count is less than the count threshold, the process follows along line 148 and the controller compensates for the yaw value in normal mode as indicated by block 152. The process then flows along line 156 where the controller again reads the vehicle speed, yaw rate, lateral acceleration and steering wheel angle as provided by block 102 and repeats the process.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:
1. A system for compensating understeer and oversteer in a vehicle having a steer by wire system, the system comprising:
   a driver interface system for receiving steering input;
   a sensor system to sense the steering input and generate a steering control signal;
   a controller in electrical communication with the sensor system to receive the steering control signal, wherein the controller is configured to determine when an understeer or oversteer condition exists and generate a steering assist signal;
   a road wheel steering actuation system configured to receive the steering assist signal and adjust a road wheel angle based on the steering assist signal;
   wherein the controller includes a proportional integral algorithm and an input to the proportional integral algorithm is the difference between a steering wheel angle and a predetermined understeer compensation reference value scheduled based on a vehicle speed.

2. The system according to claim 1, wherein the controller is configured to determine if a oversteer condition exists based on a measured yaw rate and a measured lateral acceleration signal.

3. The system according to claim 2, wherein the controller is configured to determine if an oversteer condition exists based on a desired yaw rate and a desired lateral acceleration.

4. The system according to claim 2, wherein the desired yaw rate is calculated according to the relationship:

$$r_{des} = \frac{VhSpd * Steeringratio * SWA}{L + K * VhSpd^2}$$

where,
   $r_{des}$: desired yaw rate
   L: wheelbase of the vehicle
   K: understeer coefficient
   VhSpd: vehicle speed
   SWA: steering wheel angle
   Steeringratio: steering ratio.

5. The system according to claim 2, wherein the desired lateral acceleration is calculated based on the relationship:

$$Lat_{des} = \frac{VhSpd^2 * Steeringratio * SWA}{L + K * VhSpd^2}$$

where,
   $Lat_{des}$: desired lateral acceleration
   L: wheelbase of the vehicle
   K: understeer coefficient
   VhSpd: vehicle speed
   SWA: steering wheel angle
   Steeringratio: steering ratio.

6. The system according to claim 1, wherein the predetermined understeer compensation reference value is determined according to the relationship:

$$UnStrCmp_{ref} = \frac{RWA_{max}}{1 + k * VhSpd}$$

where, UnStrCmp is the understeer compensation reference value, $RWA_{max}$ is maximal allowable road wheel angle, k is an empirical value from the vehicle and VhSpd is the vehicle speed.

7. The system according to claim 1, wherein the controller is configured to generate a steering assist signal such that a yaw rate error and a lateral acceleration error is minimized.

8. A method for compensating understeer and oversteer in a vehicle having a steer by wire system, the method comprising:
    receiving steering input from a driver interface system;
    sensing the steering input with a sensor system;
    generating a steering control signal;
    receiving the steering control signal into a controller;
    determining when an understeer or oversteer condition exists utilizing the controller;
    generating a steering assist signal; and
    adjusting a road wheel angle based on the steering assist signal further comprising calculating the difference between a steering wheel angle and a predetermined understeer compensation reference value scheduled based on a vehicle speed.

9. The method according to claim 8, wherein the step of determining when an understeer condition exists based on a measured yaw rate and a measured lateral acceleration signal.

10. The method according to claim 9, further comprising determining if an understeer condition exists based on a desired yaw rate and a desired lateral acceleration.

11. The method according to claim 10, further comprising determining an understeer condition exists when the magnitude of the desired yaw rate is greater than the measured yaw rate by a first threshold value for a first time period and the magnitude of the desired lateral acceleration is greater than the measured lateral acceleration by a second threshold for a second time period.

12. The method according to claim 8, further comprising determining if a oversteer condition exists based on a measured yaw rate and a measured lateral acceleration signal.

13. The method according to claim 12, further comprising determining if an oversteer condition exists based on a desired yaw rate and a desired lateral acceleration.

14. The method according to claim 13, further comprising determining an oversteer condition exists if the magnitude of the desired yaw rate is less than the measured yaw rate by a first threshold value for a first time period and the magnitude of the desired lateral acceleration is less than the measured lateral acceleration by a second threshold for a second time period.

15. The method according to claim 12, further comprising calculating the desired yaw rate according to the relationship:

$$r_{des} = \frac{VhSpd * Steeringratio * SWA}{L + K * VhSpd^2}$$

where,
    $r_{des}$: desired yaw rate
    L: wheelbase of the vehicle
    K: understeer coefficient
    VhSpd: vehicle speed
    SWA: steering wheel angle
    Steeringratio: steering ratio.

16. The method according to claim 12, further comprising calculating the desired lateral acceleration based on the relationship:

$$Lat_{des} = \frac{VhSpd^2 * Steeringratio * SWA}{L + K * VhSpd^2}$$

where,
    $Lat_{des}$: desired lateral acceleration
    L: wheelbase of the vehicle
    K: understeer coefficient
    VhSpd: vehicle speed
    SWA: steering wheel angle
    Steeringratio: steering ratio.

17. The method according to claim 8, further comprising calculating the predetermined understeer compensation reference value according to the relationship:

$$UnStrCmp_{ref} = \frac{RWA_{max}}{1 + k * VhSpd}$$

where, UnStrCmp is the understeer compensation reference value, $RWA_{max}$ is maximal allowable road wheel angle, k is an empirical value from the vehicle and VhSpd is the vehicle speed.

18. The method according to claim 8, further comprising generating a steering assist signal based on a proportional integral algorithm.

19. The method according to claim 8, further comprising generating a steering assist signal such that a yaw rate error and a lateral acceleration error is minimized.

* * * * *

UNITED STATES PATENT AND TRADEMARK OFFICE
CERTIFICATE OF CORRECTION

| | | |
|---|---|---|
| PATENT NO. | : 7,032,705 B2 | Page 1 of 1 |
| APPLICATION NO. | : 10/789572 | |
| DATED | : April 25, 2006 | |
| INVENTOR(S) | : Bing Zheng et al. | |

It is certified that error appears in the above-identified patent and that said Letters Patent is hereby corrected as shown below:

Column 6, in claim 5, line 3, delete "$VhSpt^2$" and substitute --$VhSpd^2$-- in its place.

Column 7, in claim 9, line 2, after "condition exists" insert --is--.

Column 8, in claim 16, line 4, delete "$VhSpt^2$" and substitute --$VhSpd^2$-- in its place.

Signed and Sealed this

Twenty-first Day of November, 2006

JON W. DUDAS
*Director of the United States Patent and Trademark Office*